US011215211B2

(12) United States Patent
Zerillo et al.

(10) Patent No.: US 11,215,211 B2
(45) Date of Patent: Jan. 4, 2022

(54) READY-TO-ASSEMBLE MATTRESS FOUNDATIONS

(71) Applicant: HANDY BUTTON MACHINE CO., Wheeling, IL (US)

(72) Inventors: Peter Joseph Zerillo, Chicago, IL (US); Trace T. Thayer, Arlington Heights, IL (US)

(73) Assignee: HANDY BUTTON MACHINE CO., Wheeling, IL (US)

( * ) Notice: Subject to any disclaimer, the term of this patent is extended or adjusted under 35 U.S.C. 154(b) by 138 days.

(21) Appl. No.: 16/539,592

(22) Filed: Aug. 13, 2019

(65) Prior Publication Data

US 2020/0049183 A1 Feb. 13, 2020

Related U.S. Application Data

(60) Provisional application No. 62/846,886, filed on May 13, 2019, provisional application No. 62/718,162, filed on Aug. 13, 2018.

(51) Int. Cl.
*F16B 12/56* (2006.01)
*A47C 19/00* (2006.01)
(Continued)

(52) U.S. Cl.
CPC ............ *F16B 12/56* (2013.01); *A47C 19/005* (2013.01); *A47C 19/024* (2013.01); *F16B 12/54* (2013.01); *F16B 12/58* (2013.01)

(58) Field of Classification Search
CPC .......... F16B 12/00; F16B 12/14; F16B 12/26; F16B 12/38; F16B 12/44; F16B 12/5054;
(Continued)

(56) References Cited

U.S. PATENT DOCUMENTS 1,625,612 A * 4/1927 Jensen ................. F16B 5/0048
403/14
1,648,591 A * 11/1927 Repay ..................... B65D 9/22
217/65
(Continued)

FOREIGN PATENT DOCUMENTS

AU 2015322081 A1 12/2016

*Primary Examiner* — Peter M. Cuomo
*Assistant Examiner* — Rahib T Zaman
(74) *Attorney, Agent, or Firm* — Marshall, Gerstein & Borun LLP

(57) ABSTRACT

A ready-to-assemble mattress foundation including a plurality of rails forming a mattress foundation having a plurality of corners. The mattress foundation includes a plurality of corner connector assemblies coupling the rails together at the corners. Each of the corner connector assemblies includes a first corner bracket; a second corner bracket; a pin including internal threads and external threads; and a fastener threadably engaging the external threads of the pin to retain the pin relative to the corner brackets. The pin extends through the first apertures and the second apertures. The mattress foundation includes a plurality of central support assemblies coupled to one or more of the rails. Each of the central support assemblies includes a body having internal threads. The mattress foundation includes a plurality of legs each including a threaded rod and threadably received within the internal threads of the pin and the central support assemblies.

20 Claims, 10 Drawing Sheets

(51) Int. Cl.
*A47C 19/02* (2006.01)
*F16B 12/54* (2006.01)
*F16B 12/58* (2006.01)

(58) Field of Classification Search
CPC .......... F16B 12/56; F16B 12/58; F16B 12/60; F16B 2012/145; F16B 2012/505; F16B 1/00; A47C 19/00; A47C 19/02; A47C 19/005; A47C 19/024; A47C 19/021; A47C 19/025; B25G 3/02
See application file for complete search history.

(56) References Cited

U.S. PATENT DOCUMENTS

| | | | | |
|---|---|---|---|---|
| 3,926,529 A * | 12/1975 | Brooks | ............... | F16B 12/24 403/4 |
| 5,709,500 A * | 1/1998 | Mizelle | ............... | A47C 4/02 16/386 |
| 8,147,012 B2 * | 4/2012 | Green | ............... | F16B 12/46 312/348.2 |
| 8,281,447 B1 * | 10/2012 | Wilson | ............... | A46B 17/02 15/146 |
| 8,990,979 B1 * | 3/2015 | Craver | ............... | A47C 19/021 5/400 |
| 9,538,851 B2 | 1/2017 | Craver | | |
| 9,782,013 B2 | 10/2017 | Craver | | |
| 9,930,970 B2 | 4/2018 | Gopalakrishnan et al. | | |
| 10,024,580 B2 * | 7/2018 | Stephan | ............... | F24S 25/67 |
| 10,390,627 B2 | 8/2019 | Lee | | |
| 2007/0003363 A1 * | 1/2007 | Tseng | ............... | F16B 13/02 403/238 |
| 2008/0208709 A1 * | 8/2008 | Craver | ............... | B65D 85/70 705/26.8 |
| 2016/0066690 A1 * | 3/2016 | Duffy | ............... | B44D 3/00 248/441.1 |
| 2017/0042336 A1 | 2/2017 | Craver | | |
| 2017/0303693 A1 | 10/2017 | Bartelsmeyer et al. | | |
| 2019/0021508 A1 * | 1/2019 | Jewett | ............... | A47C 19/005 |

* cited by examiner

READY-TO-ASSEMBLE MATTRESS FOUNDATIONS

FIELD OF THE DISCLOSURE

The present patent relates generally to ready-to-assemble mattress foundations and, in particular, relates to ready-to-assemble mattress foundations having legs to selectively change an appearance of the mattress foundations.

BACKGROUND

There are numerous types of ready-to-assemble furniture that may be purchased by a customer and later assembled. Some ready-to-assemble furniture includes book shelves, dressers, desks and mattress foundations. To couple the corners together of some such mattress foundations, corner brackets having keyed surfaces may be used. The known corner brackets have apertures that are structured to align and receive a hollow pin. To retain the pin within the corner brackets, an upper end of the pin is twisted to position a flange of the pin under the keyed surfaces of the corner brackets. The legs may be affixed to these corner brackets by extending a threaded shaft of the leg through the hollow pin, allowing for an individual to thread a wing nut onto the end of the threaded shaft while the leg is held stationary by the individual. By requiring that the leg be held stationary while the wing nut is threaded onto the leg, a square-cross section of the leg is ensured to be located in an aesthetically pleasing location.

SUMMARY

In accordance with a first example, a ready-to-assemble mattress foundation includes a plurality of rails. The rails form a mattress foundation having a plurality of corners. The mattress foundation also includes a plurality of corner connector assemblies. The corner connector assemblies couple the rails together at the corners. Each of the corner connector assemblies includes a first corner bracket, a second corner bracket, a pin, and a fastener. The first corner bracket includes a plurality of first fingers. The first fingers include a plurality of first apertures. A plurality of first spaces are formed between the first fingers. The second corner bracket includes a plurality of second fingers. The second fingers include a plurality of second apertures. A plurality of second spaces are formed between the second fingers. The first fingers are received within the second spaces and the second fingers are received within the first spaces. The pin includes internal threads and external threads. The pin extends through the first apertures and the second apertures. The fastener threadably engages the external threads of the pin to retain the pin relative to the first and second corner brackets. The mattress foundation also includes a plurality of central support assemblies. The central support assemblies are coupled to one or more of the rails. Each of the central support assemblies includes a body having internal threads. The mattress foundation also includes a plurality of legs. Each of the legs includes a threaded rod. The threaded rod is threadably received within the internal threads of the pin and the central support assemblies.

In accordance with a second example, a corner connector assembly includes a first corner bracket, a second corner bracket, a pin, a fastener, and a leg. The first corner bracket includes a plurality of first fingers. The first fingers include a plurality of first apertures. A plurality of first spaces are formed between the first fingers. The second corner bracket includes a plurality of second fingers. The second fingers include a plurality of second apertures. A plurality of second spaces are formed between the second fingers. The first fingers are received within the second spaces and the second fingers are received within the first spaces. The pin includes internal threads and external threads. The pin extends through the first apertures and the second apertures. The fastener threadably engages the external threads of the pin to retain the pin relative to the first and second corner brackets. The leg includes a threaded rod. The threaded rod is threadably received within the internal threads of the pin.

In accordance with a third example, a corner connector includes a first corner bracket, a second corner bracket, a pin, and a fastener. The first corner bracket includes a plurality of first fingers. The first fingers include a plurality of first apertures. A plurality of first spaces are formed between the first fingers. The second corner bracket includes a plurality of second fingers. The second fingers include a plurality of second apertures. A plurality of second spaces are formed between the second fingers. The first fingers are received within the second spaces and the second fingers are received within the first spaces. The pin includes external threads. The pin extends through the first apertures and the second apertures. The fastener threadably engages the external threads of the pin to retain the pin relative to the first and second corner brackets.

In further accordance with the foregoing first, second and/or third examples, an apparatus and/or method may further include any one or more of the following:

In accordance with one example, a keyed connection is formed between the pin and at least one of the first fingers of the first corner bracket. The keyed connection prevents the pin from rotating when the pin extends through the first apertures and the second apertures.

In accordance with another example, the pin includes a flange and a key. The key extends from the flange. One of the first fingers at an end of the first corner bracket includes a slot. The key and the slot form the keyed connection.

In accordance with another example, the pin includes a flange, a first key, and a second key. The first key and the second key extend from the flange. One of the first fingers at an end of the first corner bracket includes a first slot and a second slot. The first key and the second key and the first slot and the second slot form the keyed connection.

In accordance with another example, further including a plurality of corner supports. Each of the corner supports includes a base, a first flange, and a second flange. The first flange and the second flange are positioned adjacent a plurality of exterior facing surfaces of one or more of the rails between which a corresponding corner is positioned. The base includes an aperture. The threaded rod extends through the aperture and is threadably received by the internal threads of the pin.

In accordance with another example, the pin includes an end having a chamfer. The chamfer seats the pin relative to the aperture of the corner support.

In accordance with another example, further including a plurality of central brackets. Each of the central brackets includes a base and a flange. The flange is positioned adjacent an exterior facing surface of the rail. The base includes an aperture. The threaded rod extends through the aperture and is threadably received by the internal threads of the body of the central support assembly.

In accordance with another example, further including a plurality of mounting brackets. The mounting brackets couple the body of the central support assembly to the corresponding rail. Each of the mounting brackets includes a plurality of flanges. The flanges form a plurality of tapered grooves. The central support assembly is positioned within the grooves to form an interference fit.

In accordance with another example, each of the bodies of the central support assemblies includes an aperture and a locating pin. The locating pin is received within the one or more of the rails. Further including a plurality of fasteners. One of the fasteners extends through a corresponding one of the apertures of the bodies. The fasteners couple the central support assemblies to the more of the rails.

In accordance with another example, the fastener includes an end. The end includes a plurality of prongs. The prongs engage the one or more rails to prevent the fastener from rotating.

In accordance with another example, further including a plurality of knobs. The knobs threadably engage a respective one of the fasteners. Each of the bodies of the central support assemblies includes a notch. The knobs are positioned within a respective one of the notches.

In accordance with another example, a space is formed between the flange and the body of the central support assembly. A corresponding one of the rails is received within the space.

In accordance with another example, further includes internal threads. The internal threads are to enable a leg to be attached to the corner connector.

DETAILED DESCRIPTION

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent.

Figure 1:
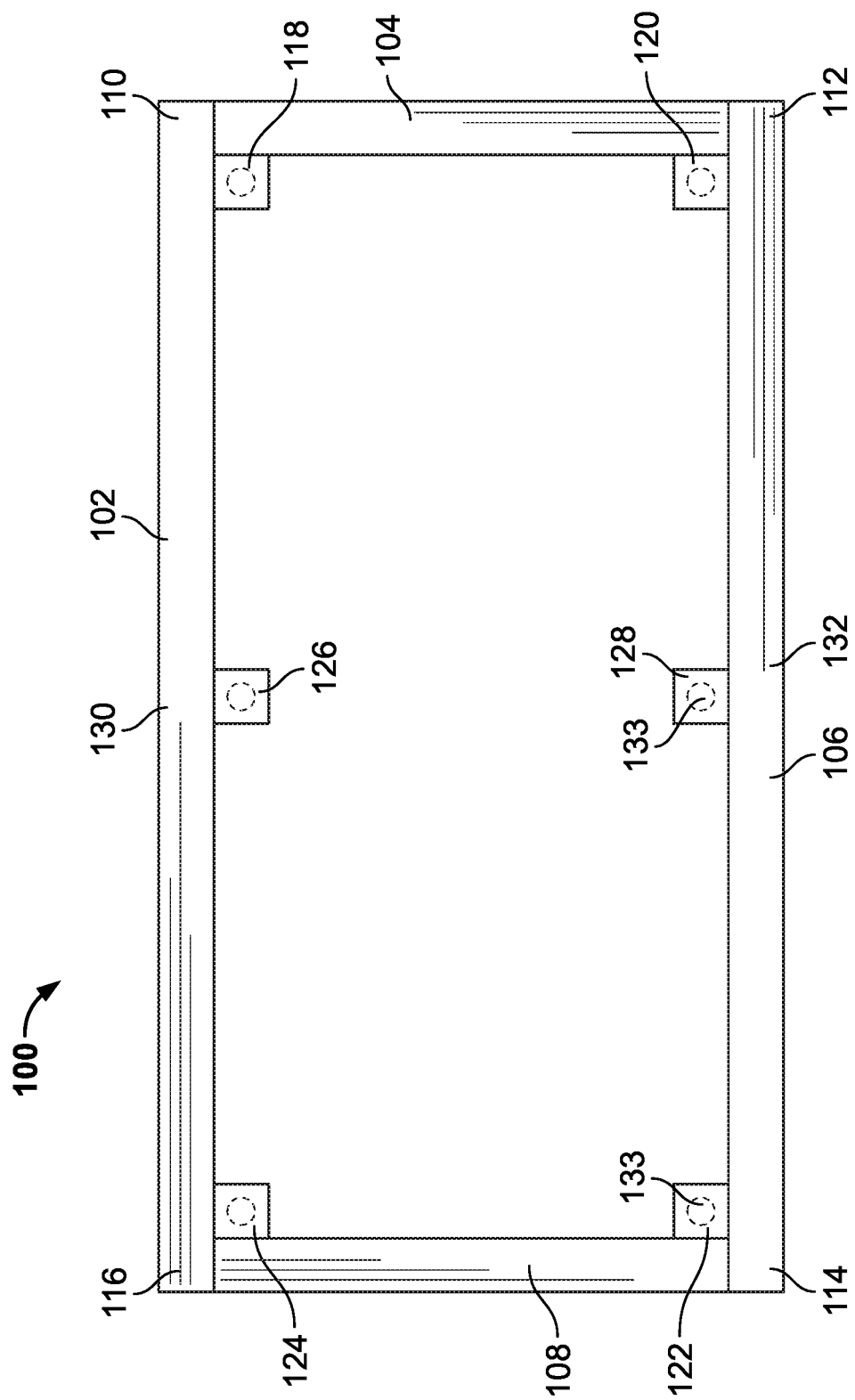
FIG. 1 illustrates a plan view a ready-to-assemble mattress foundation assembled in accordance with a first disclosed example of the present disclosure.

Referring now to the drawings, FIG. 1 shows a ready-to-assemble mattress foundation 100 assembled in accordance with a first disclosed example of the present disclosure. The mattress foundation 100 includes a plurality of rails 102, 104, 106, 108. The rails 102-108 are arranged to form the mattress foundation 100. The mattress foundation 100 has a plurality of corners 110, 112, 114, 116. The mattress foundation 100 also includes a plurality of corner connector assemblies 118, 120, 122, 124 and a plurality of central support assemblies 126, 128. The corner connector assemblies 118-124 couple the rails 102-108 together at the corners 110-116. The central support assemblies 126, 128 are coupled at a plurality of central portions 130, 132 of the rails 102, 106. A mattress (not shown) may be supported by the corner connector assemblies 118-124 and the central support assemblies 126, 128.

Legs 133 may be coupled to the corner connector assemblies 118-124 and the central support assemblies 126, 128. While the rails 102-108 are shown having particular lengths and being arranged in a particular way, the rails 102-108 may be different. For example, the rail 102 may be shorter and the rails 104, 108 may be longer such that the rail 102 is positioned between the rails 104, 108. The rails 102-108 may be sized to fit any mattress such as a twin mattress, a full mattress, a queen mattress or a king mattress. Other arrangements are possible as well.

Figure 2:
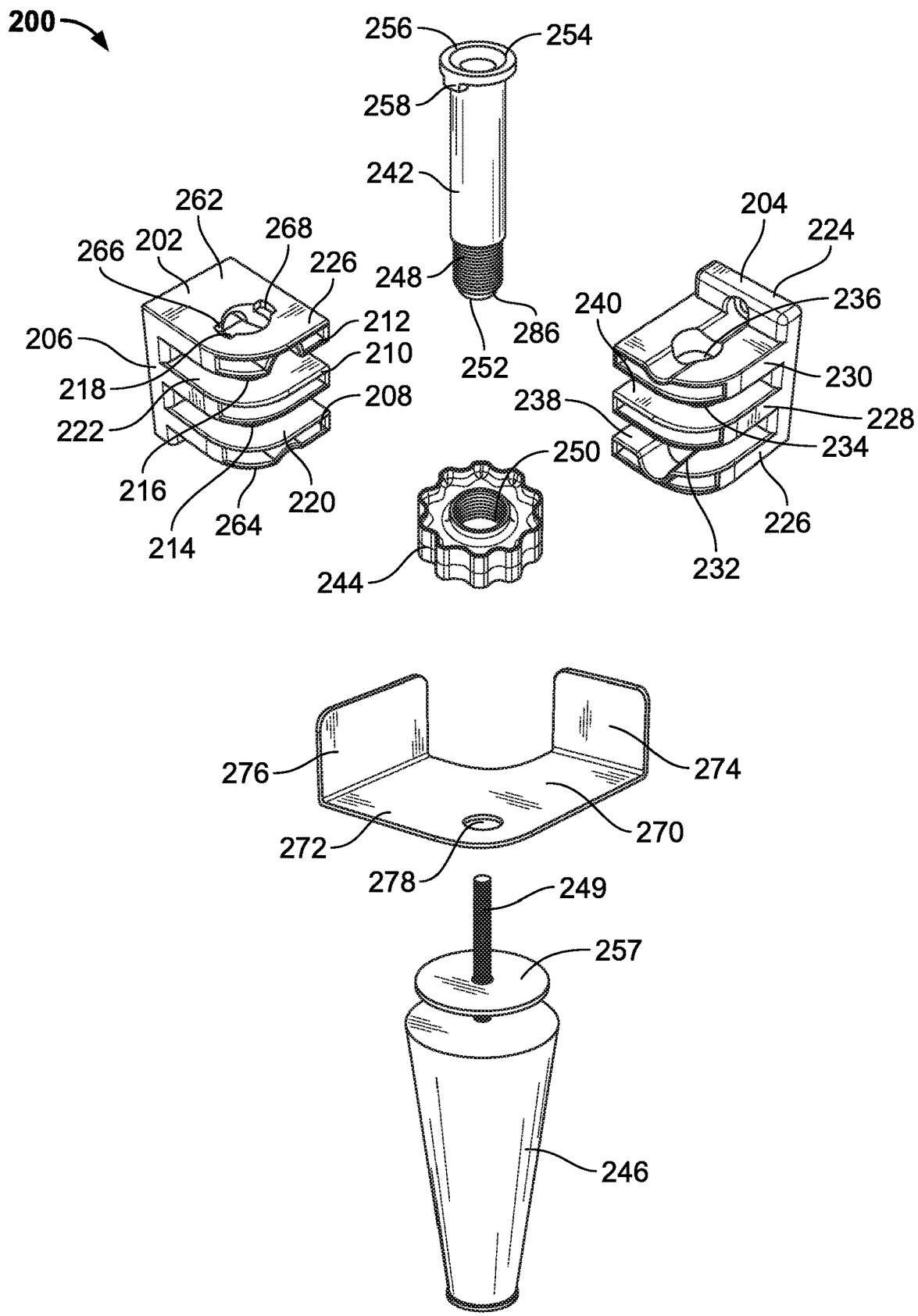
FIG. 2 illustrates an expanded view of a corner connector assembly that may be used with the mattress foundation of FIG. 1.

Referring to FIG. 2, a corner connector assembly 200 is shown that may be used as the corner connector assemblies 118-124 of FIG. 1. The corner connector assembly 200 includes a first corner bracket 202 and a second corner bracket 204. The first corner bracket 202 includes a base 206 and a plurality of first fingers 208, 210, 212. The first fingers 208-212 include a plurality of first apertures 214, 216, 218. A plurality of first spaces 220, 222 are formed between the first fingers 208-212. Similarly, the second corner bracket 204 includes a base 224 and a plurality of second fingers 226, 228, 230. The second fingers 226-230 include a plurality of second apertures 232, 234, 236. A plurality of first spaces 238, 240 are formed between the second fingers 226, 228, 230.

Figure 5:
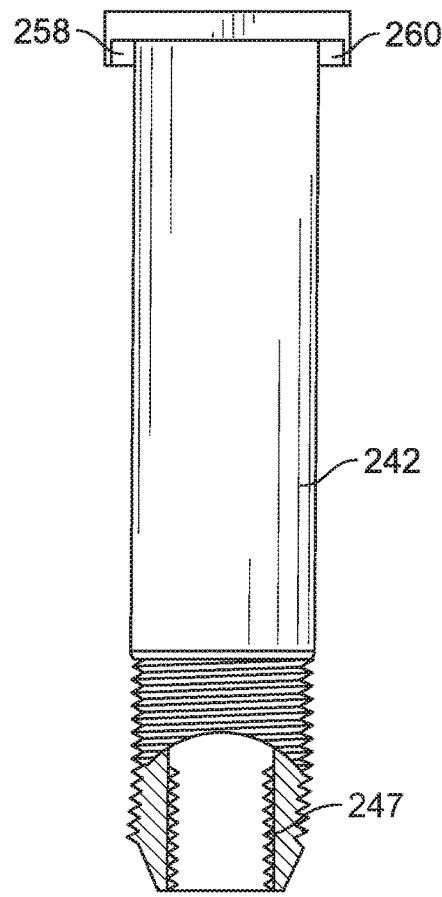
FIG. 5 illustrates a partial cross-sectional view of a pin of the corner connector assembly of FIG. 2.

The corner connector assembly 200 also includes a pin 242, a fastener 244 and a leg 246. The pin 242 may be plastic, metal or any other suitable material. The pin 242 includes internal threads 247 (the internal threads 247 are best visible in FIG. 5) and external threads 248. The fastener 244 includes internal threads 250. When the corner connector assembly 200 is assembled, the fastener 244 threadably engages the pin 242.

The leg 246 includes a threaded rod 249. A washer 257 is positioned about the threaded rod 249. The washer 257 may be made of rubber, plastic or another material. In the event the floor beneath the legs 246 of the mattress foundation 100 is uneven, one or more additional washers (not shown) may be provided as-needed intermediate the washer 257 and the top of the leg 246 to serve as spacers or shims so as to level the mattress foundation 100.

Figure 3:
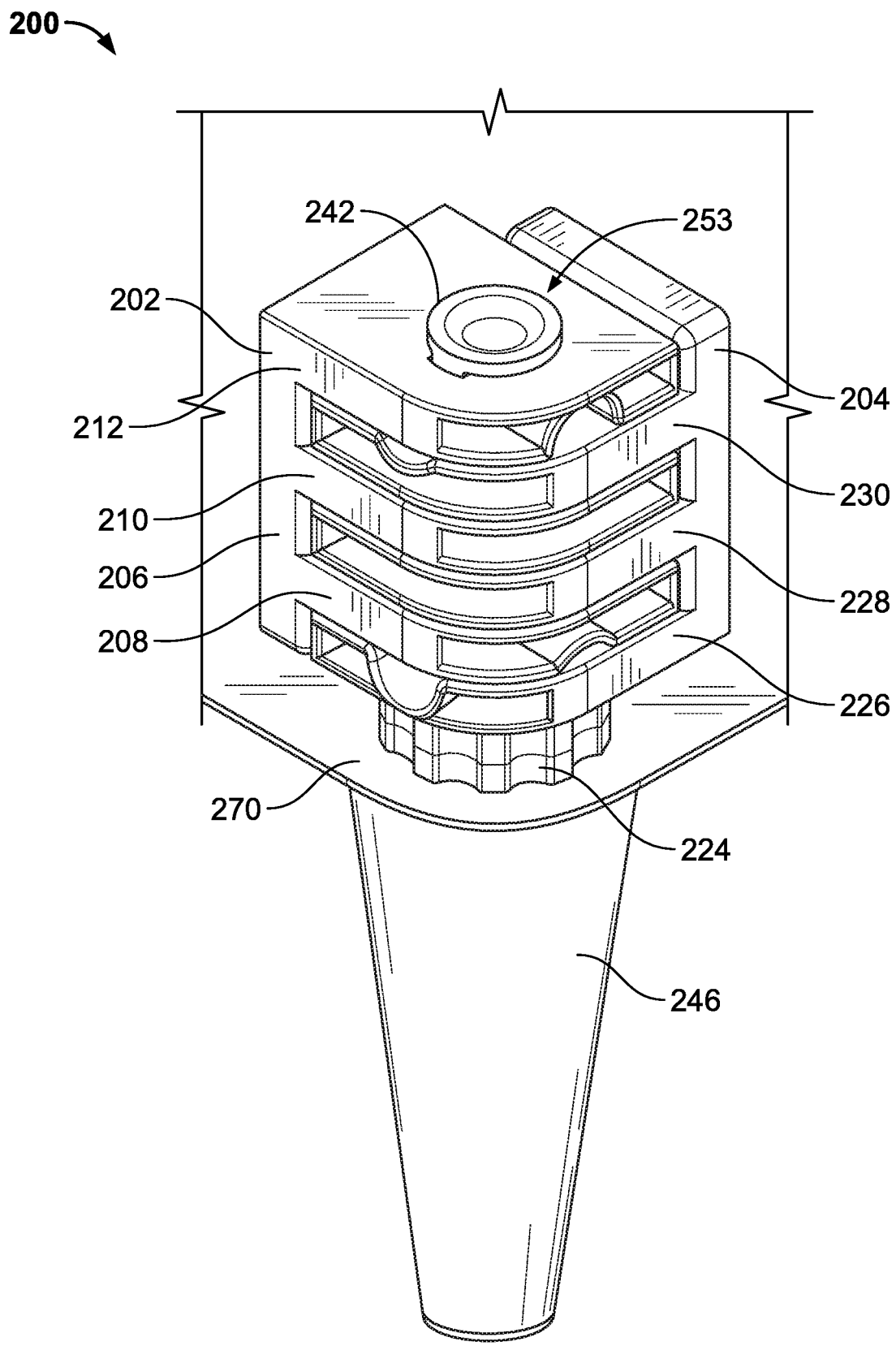
FIG. 3 illustrates an assembled view of the corner connector assembly of FIG. 2.

Referring now to FIG. 3, the first fingers 208-212 are shown received within the second spaces 238, 240 and the second fingers 226-230 are shown received within the first spaces 220, 222. Additionally, the pin 242 is shown extending through the first apertures 214-218 and the second apertures 232-236 of the respective corner brackets 202, 204. The apertures 214-218 and 232-236 may have a contour that corresponds to a contour of the pin 242. The pin 242 may be cylindrical. Alternatively, the pin 242 may have a tapering contour (see, for example, FIG. 6).

To retain the pin 242 relative to the corner brackets 202, 204, the fastener 244 threadably engages the external threads 248 of the pin 242. To couple the leg 246 to the corner connector 201, the threaded rod 249 of the leg 246 is threadably received by the internal threads 247 of the pin 242.

A keyed connection 253 is formed between the pin 242 and the finger 212 of the first corner bracket 202. The keyed connection 253 prevents the pin 242 from rotating when the pin 242 extends through the first apertures 214-218 and the second apertures 232-236. Thus, the pin 242 may rotate while the fastener 244 is threaded onto the pin 242.

Referring back to FIG. 2, the pin 242 includes a first end 252 and a second end 254. The pin 242 also includes a flange 256, a first key 258 and a second key 260 (the second key 260 is best visible in FIG. 5). The keys 258, 260 extend from the flange 256. In the example shown, the flange 256 and the keys 258, 260 are positioned near or at the second end 254. The first key 258 and the second key 260 are positioned on opposite sides of the pin 242 (shown most clearly in FIG. 5). The keys 258, 260 have circumferential surfaces that are coaxial to an exterior surface of the pin 242. However, the keys 258, 260 may have a different shape. While two keys 258, 260 are included, one of the keys 258, 260 may be provided instead of two.

The first corner bracket 202 includes a first end 262 and a second end 264. The finger 212 of the first corner bracket 202 at the first end 262 includes a first slot 266 and a second slot 268. When the pin 242 has one key 258 or 260, the first corner bracket 202 may alternatively have one slot 266 or 268. The slots 266, 268 are formed as blind holes and have a shape that corresponds to the shape of the keys 258, 260. However, the slots 266, 268 may alternatively fully extend through the finger 212.

In the example shown, the keys 258, 260 and the slots 266, 268 form the keyed connection 253. Specifically, when the pin 242 extends through the first apertures 214-218 and the second apertures 232-236, the keys 258, 260 are received within slots 266, 268 to prevent the pin 242 from rotating when the fastener 244 is being threaded onto the first end 252 of the pin 242.

The corner connector assembly 200 also includes a corner support 270. The corner support 270 includes a base 272, a first flange 274 and a second flange 276. The base 272 also includes an aperture 278. The aperture 278 is sized to receive the threaded rod 249.

Referring to FIG. 3, the leg 246 is shown coupled to the pin 242. Thus, the threaded rod 249 is shown extending through the aperture 278 and being threadably received by the pin 242.

Figure 4:
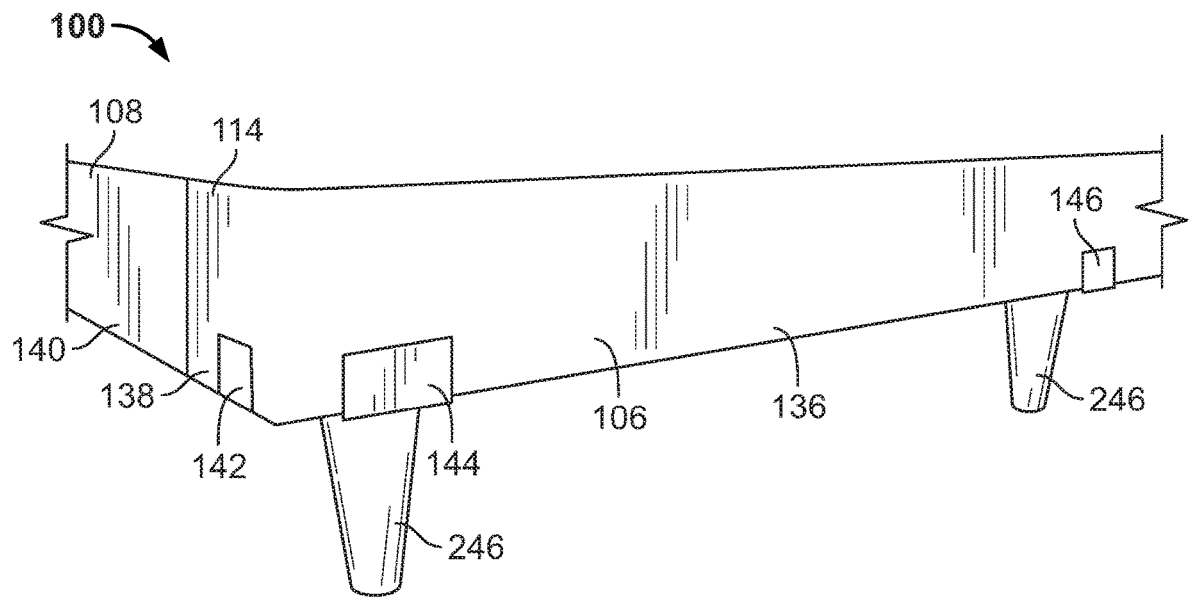
FIG. 4 illustrates a partial isometric view of the mattress foundation of FIG. 1.

Referring to FIG. 4, an isometric view of the mattress foundation 100 of FIG. 1 is shown illustrating the rails 106, 108 meeting at the corner 114. The rail 106 includes a plurality of exterior-facing surfaces 136, 138 and the rail 108 includes an exterior facing surface 140. In the example shown, a first flange 142 of the corner connector assembly 122 is positioned adjacent the exterior-facing surface 282 of the rail 106 and a second flange 144 of the corner connector assembly 122 is positioned adjacent the exterior-facing surface 136 of the rail 106 such that the corner 114 is positioned between the first and second flanges 142, 144. A flange 146 of the central support assembly 128 is also shown positioned adjacent the exterior-facing surface 136.

Referring back to FIG. 2, the first end 252 of the pin 242 includes a chamfer 286. When the pin 242 is received within the apertures 214-218 and 232-236 and engages the corner support 270, the chamfer 286 seats within the aperture 278 of the corner support 270 and aligns the pin 242 relative thereto. An interaction between the chamfer 286 and the corner support 270 may deter relative movement between the pin 242 and the corner support 270.

Figure 6:
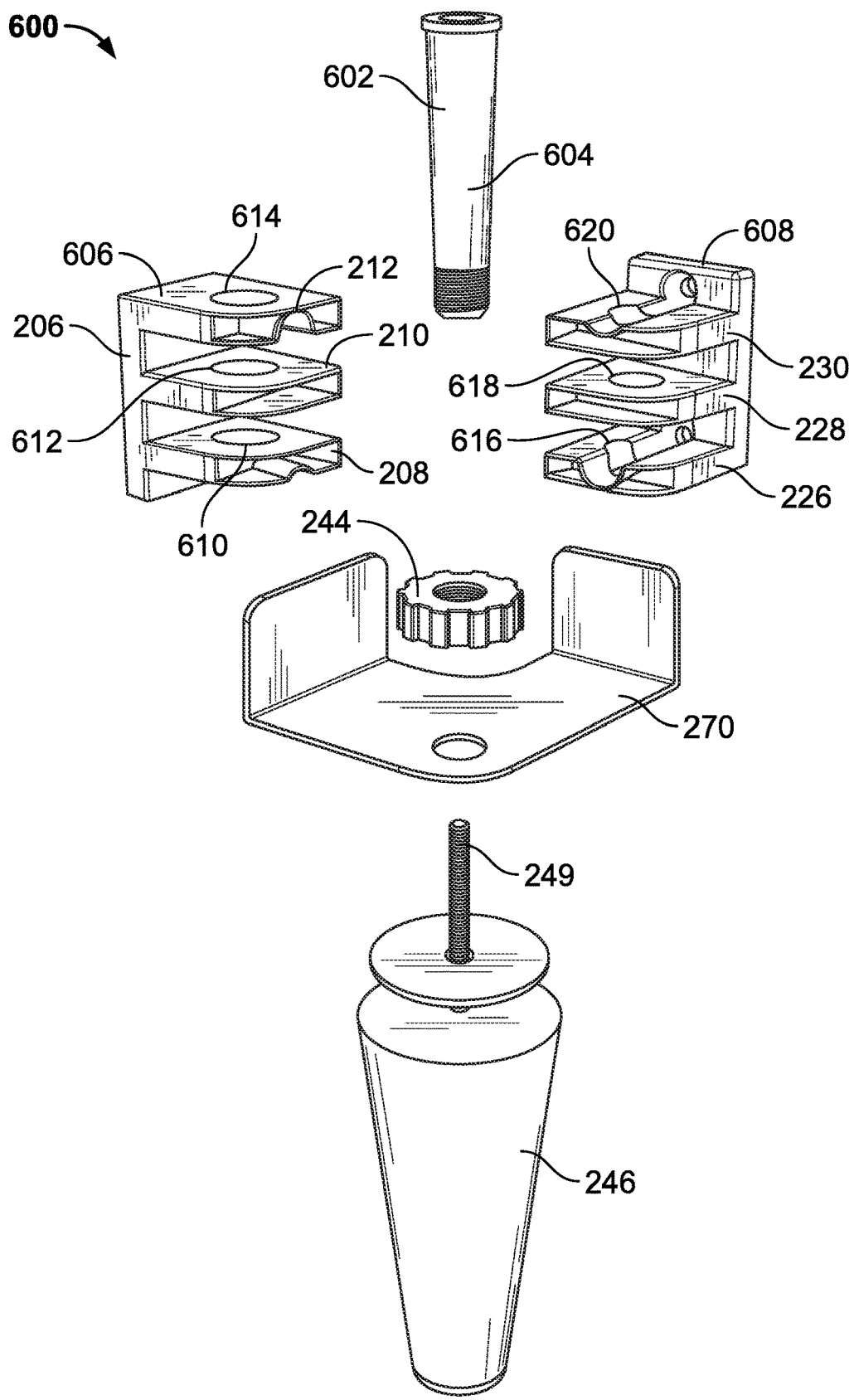
FIG. 6 illustrates another expanded view of a corner connector assembly that may be used with the mattress foundation of FIG. 1.

Referring to FIG. 6, another corner connector assembly 600 is shown that may be used as the corner connector assemblies 118-124 of FIG. 1. The corner connector assembly 600 is similar to the corner connector assembly 200 of FIG. 2. However, in contrast, the corner connector assembly 600 includes a pin 602 having a tapered-exterior surface 604. Also, the corner connector assembly 600 includes a first corner bracket 606 and a second corner bracket 608. The first fingers 208-212 of the first corner bracket 606 include a plurality of first apertures 610, 612, 614 and the second fingers 226-230 of the second bracket corner 608 include a plurality of second apertures 616, 618, 620. The surfaces defining the apertures 610-620 are also tapered. Having the pin 602 and the apertures 610-620 have corresponding tapered surfaces increases the contact area between the pin 602 and the corner brackets 606, 608 when the pin 602 is extending through the apertures 610-620.

Figure 7:
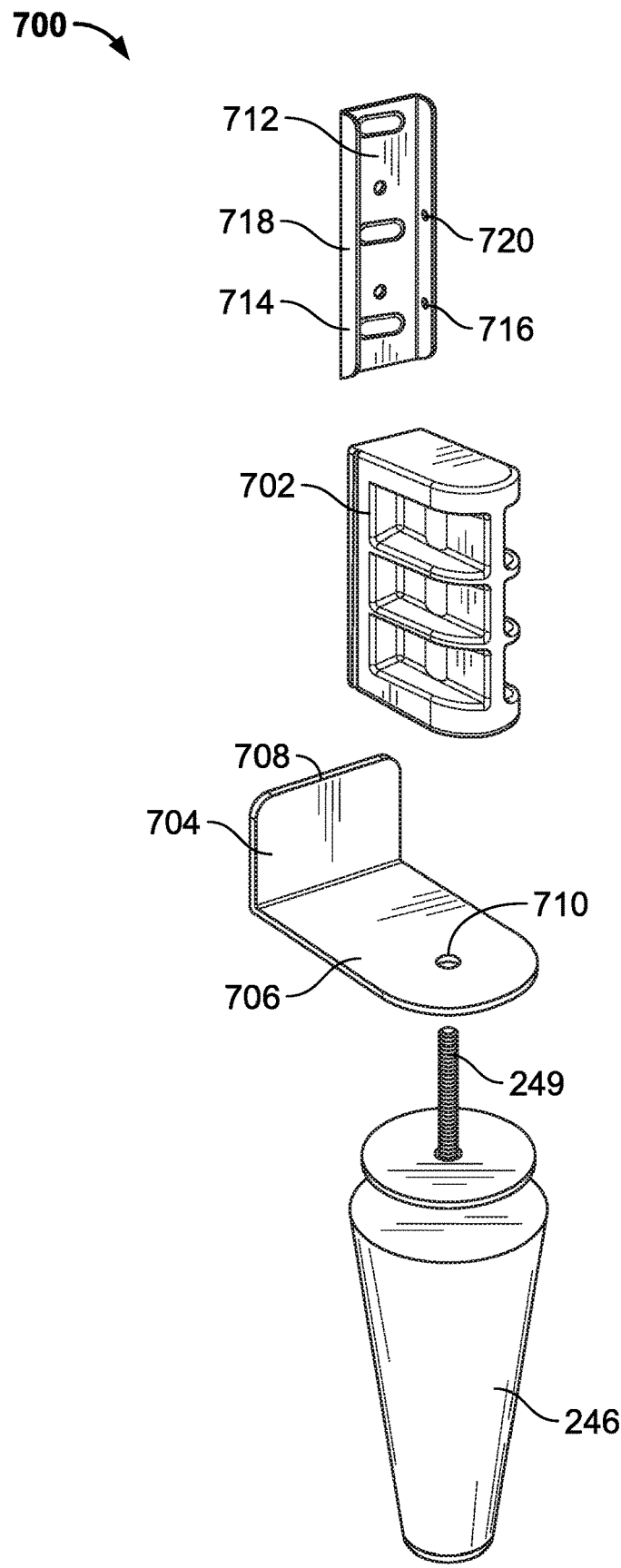
FIG. 7 illustrates an expanded view of a central support assembly that may be used with the mattress foundation of FIG. 1.

Referring to FIG. 7, a central support assembly 700 is shown that may be used as the central support assemblies 126, 128 of FIG. 1. The central support assembly 700 includes a body 702 and a central bracket 704. The central bracket 704 includes a base 706 and a flange 708. The base 706 includes an aperture 710. The aperture 710 is sized to receive the threaded rod 249 extending from the leg 246. When the central support assembly 700 is coupled to the rail 102 or 106, a space 711 (the space 711 is best visible in FIG. 9) is formed between the flange 708 and the body 702 in which the rail 102 or 106 is positioned.

The central support assembly 700 also includes a mounting bracket 712. The mounting bracket 712 includes a plurality of flanges 714, 716. The flanges 714, 716 form a plurality of tapered grooves 718, 720. To couple the body 702 to the mounting bracket 712 that may be attached to the rail 102 or 106, the body 702 is positioned within the grooves 718, 720 to form an interference fit.

Figure 8:
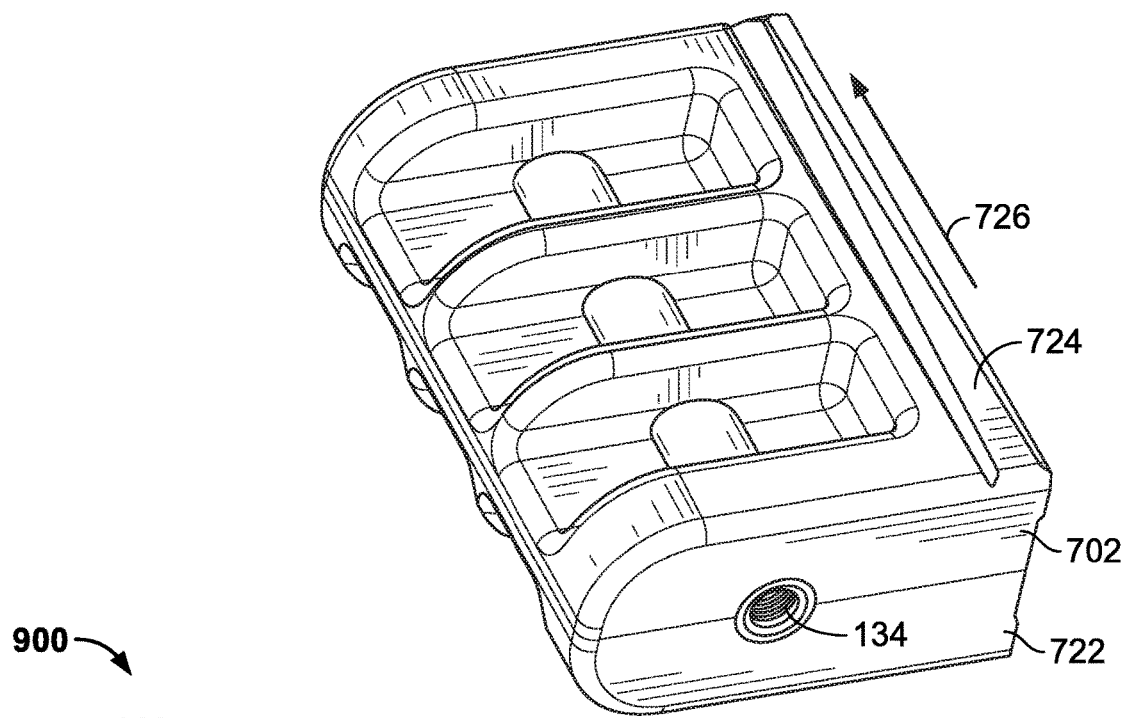
FIG. 8 illustrates an isometric view of a body of the central support assembly of FIG. 7.

Referring to FIG. 8, in the example shown, the body 702 of the central support assembly 700 includes ribs 722, 724. The ribs 722, 724 taper inwardly in a direction generally indicated by arrow 726. Thus, when the ribs 722, 724 are received within the grooves 718, 720 of the mounting bracket 712, an interference fit is formed.

Figure 9:
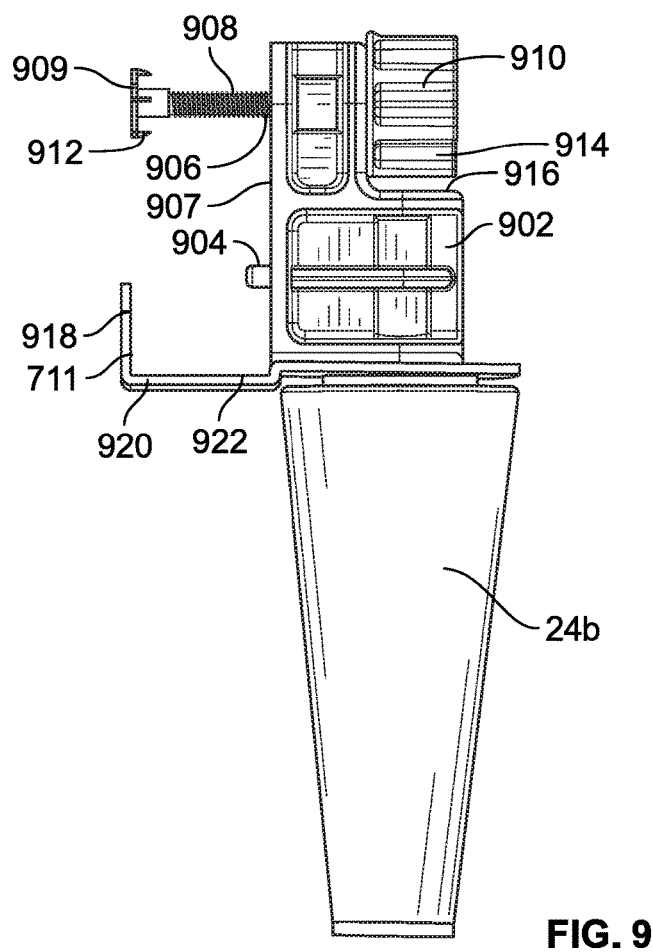
FIG. 9 illustrates an assembled view of another central support assembly that may be used with the mattress foundation of FIG. 1.

Referring to FIG. 9, another central support assembly 900 is shown that may be used as the central support assemblies 126, 128 of FIG. 1. The central support assembly 900 includes a body 902. The body 902 includes a locating pin 904 and an aperture 906. The aperture 906 extends through the body 902. The central support assembly 900 also includes a fastener 908. The fastener 908 extends through the aperture 906. The body 902 includes a surface 907 from which the locating pin 904 extends.

The fastener 908 includes a first end 909 and a second end 910. The first end 909 includes a plurality of prongs 912. When the central support assembly 900 is coupled to one of the rails 102, 106, the prongs 912 engage in the rail 102 or 106 to prevent the fastener 908 from rotating. When the central support assembly 900 is coupled to one of the rails 102, 106, the locating pin 904 is received within an aperture of the corresponding rail 102, 106 and the fastener 908 extends through the rail 102 or 106. The central support 900 includes a knob 914 and the body 902 includes a notch 916. The knob 914 is positioned within the notch 916. The knob 914 threadably engages the fastener 908 at the second end 910 of the fastener 908. Rotating the knob 914 when the fastener 908 is not rotating, draws the first end 909 of the fastener 908 toward the knob 914.

The central support assembly 900 also includes a central bracket 918. In contrast to the central bracket 704 of the central support assembly 900, the central bracket 918 includes a base 920 that forms a groove 922 (e.g., the space 711). The groove 922 may be sized to receive one of the rails 102 or 106 when the central support assembly 900 is coupled thereto.

Figure 10:
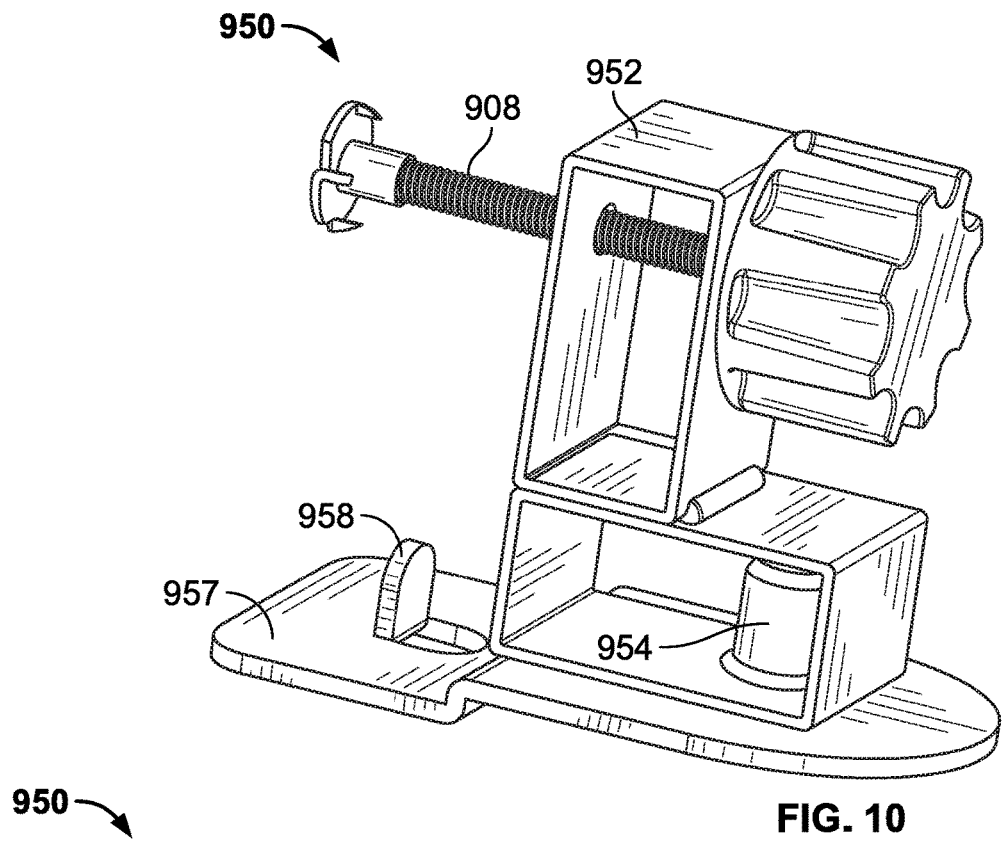
FIG. 10 illustrates another central support assembly that may be used as the central support assemblies of FIG. 1.

Referring to FIG. 10, another central support assembly 950 is shown that may be used as the central support assemblies 126, 128 of FIG. 1. The central support assembly 950 is similar to the central support assembly 900 of FIG. 9. However, in contrast, the central support assembly 950 is formed of metal and includes a frame 952 and also includes a cylindrical portion 954 defining a threaded blind bore 956 (the threaded blind bore 956 is most clearly shown in FIG. 11). The fastener 908 is shown extending through the frame 952 and the threaded blind bore 956 is adapted to threadably receive the threaded rod 249 of the leg 246.

Figure 11:
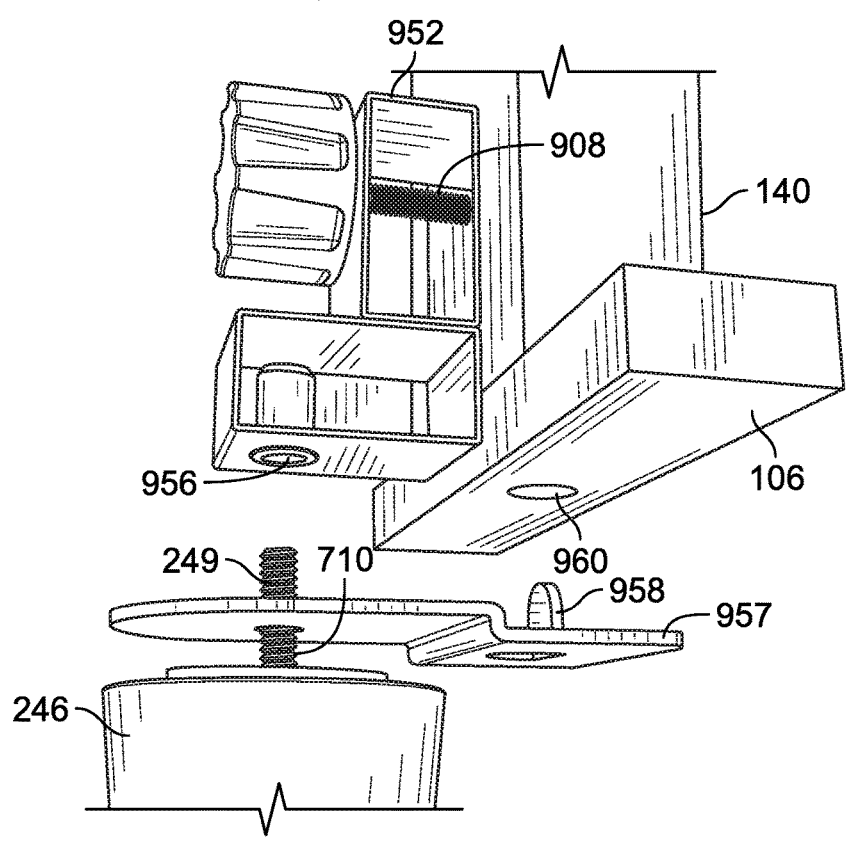
FIG. 11 illustrates an expanded view of the central support assembly of FIG. 10.

The central support assembly 950 also includes a central bracket 958 having a flange 957 that is adapted to be received within a bore 960 of the rail 106 (the bore 960 is most clearly shown in FIG. 11). Thus, in contrast to the central support assembly 900 of FIG. 9, the central support assembly 950 of FIG. 10 does not include a flange that is positioned adjacent the exterior facing surface 140 of the rail 106.

FIG. 11 illustrates an expanded view of the central support assembly 950 of FIG. 10 with the frame 952 coupled to the rail 106 via the fastener 908 and the threaded rod 249 of the leg 246 extending through the aperture 710 of the central bracket 958.

Figure 12:
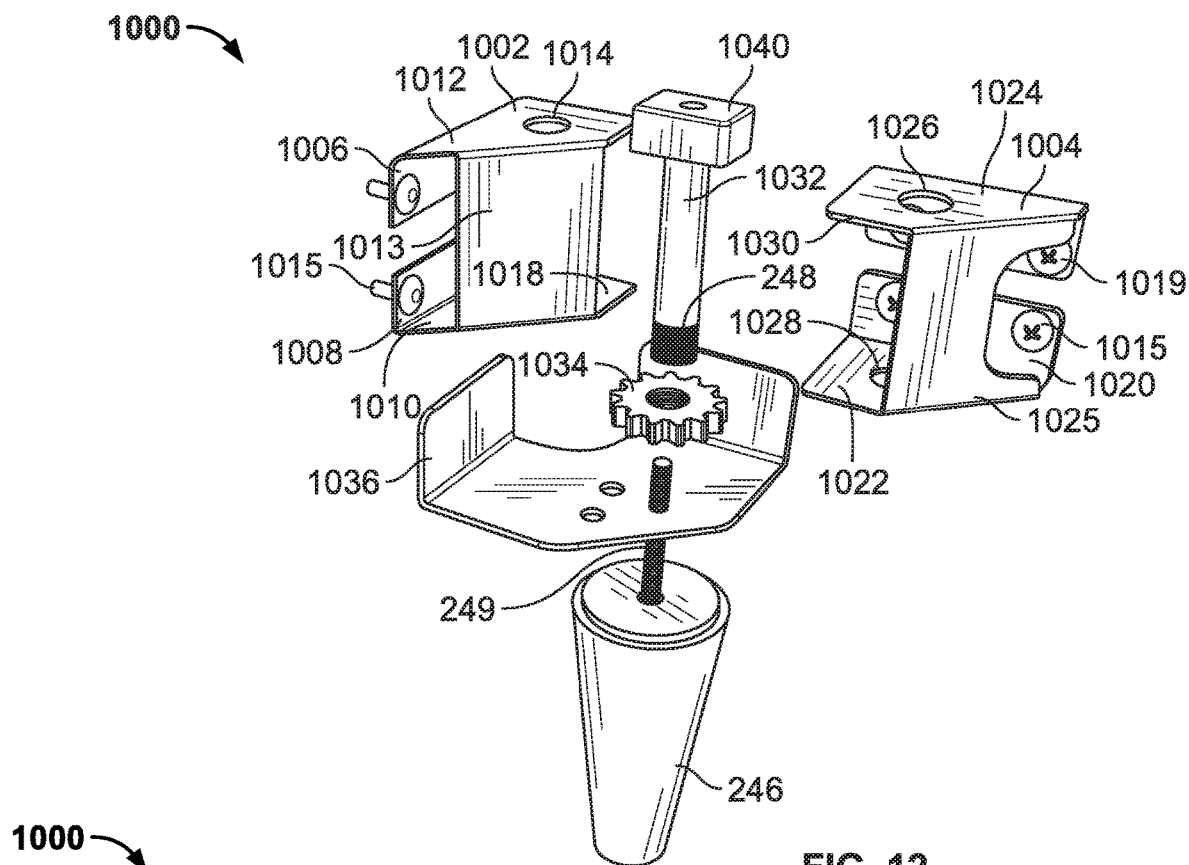
FIG. 12 illustrates an expanded view of another corner connector assembly that may be used with the mattress foundation of FIG. 1.

Referring to FIG. 12, another corner connector assembly 1000 is shown that may be used as the corner connector assemblies 118-124 of FIG. 1. The corner connector assembly 1000 includes a first corner bracket 1002 and a second corner bracket 1004. The first corner bracket 1002 includes a plurality of first flanges 1006, 1008, a plurality of first side walls 1010, 1012 and a central wall 1013. The central wall 1013 couples the first side walls 1010, 1012 together. Fasteners 1015 extend through the flanges 1006, 1008. The fasteners 10015 may be used to attach the first corner bracket 1002 to one of the rails 102-108. The first side walls 1010, 1012 include a plurality of first apertures 1014 (the second one the first apertures 1014 is hidden from view in FIG. 12). A first space 1018 is formed between the first side walls 1010, 1012.

Similarly, the second corner bracket 1004 includes a plurality of second flanges 1019, 1020, a plurality of second side walls 1022, 1024 and a central wall 1025. The central wall 1025 couples the second side walls 1022, 1024. The second side walls 1022, 1024 include a plurality of second apertures 1026, 1028. A second space 1030 is formed between the second side walls 1022, 1024. In the example shown, a width of the first space 1018 is larger than a width between the second side walls 1022, 1024. Thus, the second side walls 1022, 1024 can be received within the first space 1018.

Like the examples disclosed above, the corner connector assembly 1000 includes a pin 1032, a fastener 1034, a corner support 1036 and the leg 246. The pin 1032 includes a head 1040. In the example shown, the head 1040 has a rectangular cross-section that allows the head 1040 to be held by hand or with a tool as the fastener 1034 is threaded onto the external threads 248 of the pin 1032.

Figure 13:
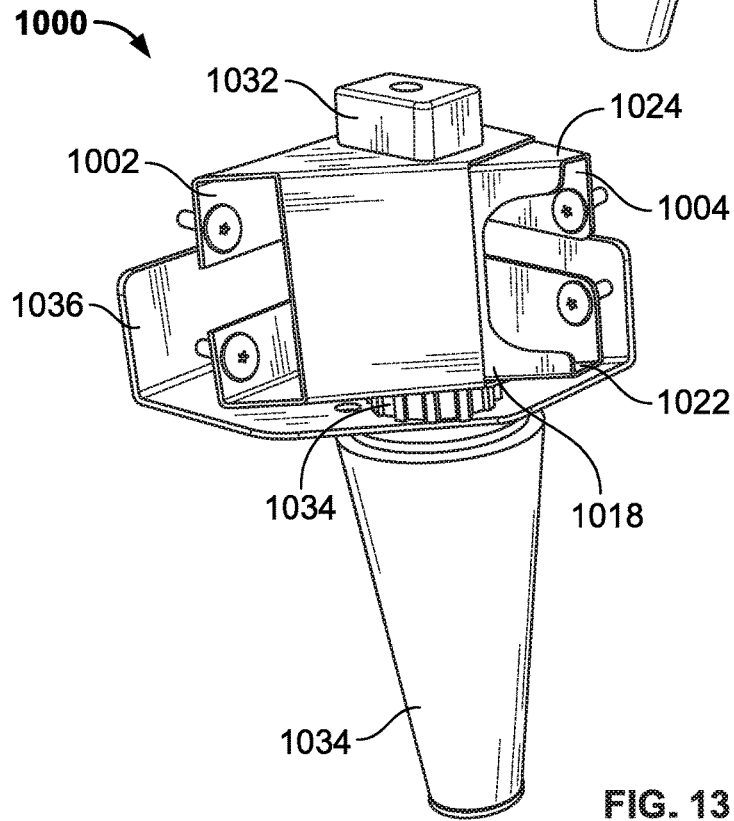
FIG. 13 is an assembled view of the corner connector assembly of FIG. 12.

Referring to FIG. 13, the second side walls 1022, 1024 are shown received within the first space 1018 and the pin 1032 is shown extending through the first apertures 1014 and the second apertures 1026, 1028. The fastener 1034 is threadably engaging the external threads 248 of the pin 1032. The threaded rod 249 of the leg 246 is extending through the corner support 1036 and being threadably received by the pin 1032.

Figure 14:
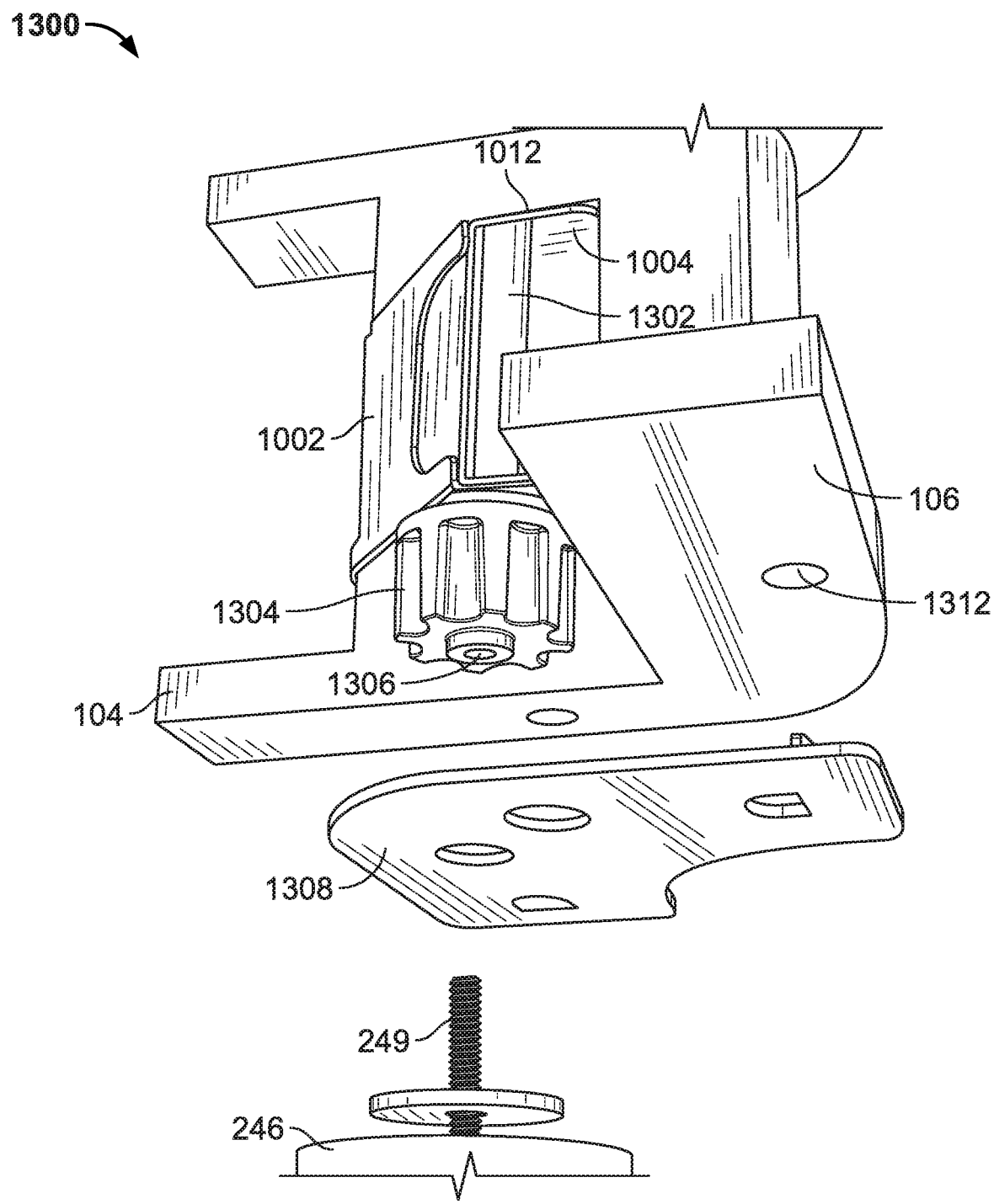
FIG. 14 illustrates another corner connector assembly that may be used as the corner connector assemblies of FIG. 1.

Referring to FIG. 14, another corner connector assembly 1300 is shown that may be used as the corner connector assemblies 118-124 of FIG. 1. The corner connector assembly 1300 of FIG. 14 is similar to the corner connector assembly 1000 of FIGS. 12 and 13. However, in contrast, the corner connector assembly 1300 of FIG. 14 includes a metal pin 1302 that extends through the corner brackets 1002, 1004. In an example, the pin 1302 includes a flange at a first distal end that engages a first side wall 1012 of the first corner bracket 1002 and includes a second distal end that threadably engages a fastener 1304. In some examples, the fastener 1304 includes first threads that are threadably engaged by the pin 1302 and second threads accessible via an aperture 1306 that are threadably engaged by the threaded rod 249 of the leg 246. In other examples, the fastener 1304 includes first threads that are threadably engaged by the pin 1302 and the pin 1302 includes internal threads accessible via the aperture 1306 of the fastener 1304 to allow the internal threads to be threadably engaged by the threaded rod 249 of the leg 246.

In further contrast to the corner support 1036 of FIGS. 12 and 13, the corner connector assembly 1300 includes a corner support 1308 including flanges 1310. The flanges 1310 are adapted to be received within bores 1312 of the rails 104, 106. Thus, the corner support 1308 does not include a flange that is positioned adjacent the exterior facing surface 136, 138 and/or 140 of the rail 106.

From the foregoing, it will be appreciated that the above disclosed apparatus, methods and articles of manufacture enable knock down (KD) foundations to be raised off of the ground, using the legs, without the use of a standard frame and without the use of hand tools. Moreover, the disclosed examples relate to corner assemblies that can be retrofitted to allow legs to be coupled to the corner assemblies. Thus, if the foundation is to be placed directly on the ground or if the foundation is to be placed on a separate frame, a first pin without internal and/or without external threads may be used to secure the rails of the foundation together.

To retrofit the foundation to allow legs to be directly attached to the foundation, without the use of a separate frame, a second pin with internal threads and with external threads may be used to secure the rails together. A nut (e.g., a threaded fastener) may retain the second pin within the corner bracket assembly and a threaded rod of a leg may thread into the corner bracket assembly to couple the leg to the foundation. Six outside legs may be coupled around a perimeter of the foundation (e.g., four corner legs and two central legs). However, any other number of legs may be used. While the above corner and center assemblies are disclosed in connection with mattress foundations, the example corner and/or center assemblies may be used with other types of KD furniture such as armoires, couches, chairs, cabinets, where the customer may selectively choose to raise or lower the height of the furniture using legs.

ASPECTS OF THE DISCLOSURE

In accordance with an aspect of the disclosure, a corner connector for use with ready-to-assemble furniture, the corner connector includes a first corner bracket, a second corner bracket, a pin, a fastener, and a leg. The first corner bracket includes a plurality of first flanges and a plurality of first side walls. The first side walls include a plurality of first apertures. A first space is formed between the first side walls. The second corner bracket includes a plurality of second flanges and a plurality of second side walls. The second side walls include a plurality of second apertures. The second side walls are received within the first space. The pin includes internal threads and external threads. The pin extends through the first apertures and the second apertures. The fastener threadably engages the external threads of the pin to retain the pin relative to the corner brackets. The leg includes a threaded rod. The threaded rod is threadably received within the internal threads of the pin.

In accordance with another aspect of the disclosure, a ready-to-assemble mattress foundation includes a plurality of rails and a plurality of corner connector assemblies. The rails form a mattress foundation having a plurality of corners. The corner connector assemblies couple the rails together at the corners. Each of the corner connector assemblies includes a plurality of mating corner brackets, a pin, and a fastener. The pin includes internal threads and external threads. The pin extends through the corner brackets. The fastener threadably engages the external threads to retain the pin relative to the corner brackets. The mattress foundation also includes a plurality of central supports. The central supports are coupled to at least two of the rails. Each of the central supports includes internal threads. The mattress foundation also includes a plurality of legs. The legs include a threaded rod that is threadably received within the internal threads of the pin and the central supports.

While several examples have been disclosed herein, any features from any examples may be combined with or replaced by other features from other examples. Moreover, while several examples have been disclosed herein, changes may be made to the disclosed examples without departing from the scope of the claims.

What is claimed is:

1. A ready-to-assemble mattress foundation comprising:
    a plurality of rails, the rails forming a mattress foundation having a plurality of corners;
    a plurality of corner connector assemblies, the corner connector assemblies coupling the rails together at the corners, each of the corner connector assemblies including:
        a first corner bracket, the first corner bracket including a plurality of first fingers, the first fingers including a plurality of first apertures, a plurality of first spaces formed between the first fingers;
        a second corner bracket, the second corner bracket including a plurality of second fingers, the second fingers including a plurality of second apertures, a plurality of second spaces formed between the second fingers, wherein the first fingers are received within the second spaces and the second fingers are received within the first spaces;
        a pin, the pin including internal threads, the pin extending through the first apertures and the second apertures;
    a plurality of central support assemblies, the central support assemblies coupled to one or more of the rails, each of the central support assemblies includes a body having internal threads;
    a plurality of central brackets, each of the central brackets includes a base and a flange, the flange positioned adjacent an exterior facing surface of the rail, the base includes an aperture, the threaded rod extending through the aperture and being threadably received by the internal threads of the body of the central support assembly;
    a plurality of mounting brackets, the mounting brackets coupling the body of the central support assembly to the corresponding rail, each of the mounting brackets includes a plurality of flanges, the flanges form a plurality of tapered grooves, the central support assembly being positioned within the grooves to form an interference fit; and
    a plurality of legs, each of the legs including a threaded rod, the threaded rod threadably received within the internal threads of the pin and the central support assemblies.

2. The ready-to-assemble mattress foundation of claim 1, wherein a keyed connection is formed between the pin and at least one of the first fingers of the first corner bracket, the keyed connection prevents the pin from rotating when the pin extends through the first apertures and the second apertures.

3. The ready-to-assemble mattress foundation of claim 2, wherein the pin includes a flange and a key, the key extends from the flange, and wherein one of the first fingers at an end of the first corner bracket includes a slot, the key and the slot forming the keyed connection.

4. The ready-to-assemble mattress foundation of claim 2, wherein the pin includes a flange, a first key, and a second key, the first key and the second key extend from the flange, and wherein one of the first fingers at an end of the first corner bracket includes a first slot and a second slot, the first key and the second key and the first slot and the second slot form the keyed connection.

5. The ready-to-assemble mattress foundation of claim 1, further including a plurality of corner supports, each of the corner supports includes a base, a first flange, and a second flange, the first flange and the second flange positioned adjacent a plurality of exterior facing surfaces of one or more of the rails between which a corresponding corner is positioned, the base includes an aperture, the threaded rod extending through the aperture and being threadably received by the internal threads of the pin.

6. The ready-to-assemble mattress foundation of claim 5, wherein the pin includes an end having a chamfer, the chamfer seating the pin relative to the aperture of the corner support.

7. A ready-to-assemble mattress foundation, comprising:
    a plurality of rails, the rails forming a mattress foundation having a plurality of corners;
    a first corner bracket, the first corner bracket including a plurality of first fingers, the first fingers including a plurality of first apertures, a plurality of first spaces formed between the first fingers;
    a second corner bracket, the second corner bracket including a plurality of second fingers, the second fingers including a plurality of second apertures, a plurality of second spaces formed between the second fingers, wherein the first fingers are received within the second spaces and the second fingers are received within the first spaces;

a pin, the pin including internal threads, the pin extending through the first apertures and the second apertures;
a leg, the leg including a threaded rod, the threaded rod threadably received within the internal threads of the pin;
a plurality of central support assemblies, each of the central support assemblies coupled to one or more of the rails, each of the central support assemblies including a body having internal threads;
a plurality of central brackets, each of the central brackets including a base and a flange, the flange positioned adjacent an exterior facing surface of the rail, the base including an aperture, the threaded rod extending through the aperture and being threadably received by the internal threads of the body of the central support assembly,
each of the bodies of the central support assemblies including an aperture and a locating pin, the locating pin being received within the one or more of the rails, further including a plurality of fasteners, one of the fasteners extending through a corresponding one of the apertures of the bodies, the fasteners coupling the central support assemblies to the one or more of the rails,
the fastener including an end having a plurality of prongs, the prongs engaging the one or more rails to prevent the fastener from rotating.

8. The ready-to-assemble mattress foundation of claim 7, wherein a keyed connection is formed between the pin and at least one of the first fingers of the first corner bracket, the keyed connection prevents the pin from rotating when the pin extends through the first apertures and the second apertures.

9. The ready-to-assemble mattress foundation of claim 8, wherein the pin includes a flange and a key, the key extends from the flange, and wherein one of the first fingers at an end of the first corner bracket includes a slot, the key and the slot forming the keyed connection.

10. The ready-to-assemble mattress foundation of claim 7, further including a corner support, the corner support includes a base, a first flange, and a second flange, the base includes an aperture, the threaded rod extending through the aperture and being threadably received by the internal threads of the pin.

11. The ready-to-assemble mattress foundation of claim 7, further including a plurality of knobs, the knobs threadably engaging a respective one of the fasteners, each of the bodies of the central support assemblies includes a notch, the knobs positioned within a respective one of the notches.

12. A ready-to-assemble mattress foundation, comprising:
a plurality of rails, the rails forming a mattress foundation having a plurality of corners;
a first corner bracket, the first corner bracket including a plurality of first fingers, the first fingers including a plurality of first apertures, a plurality of first spaces formed between the first fingers;
a second corner bracket, the second corner bracket including a plurality of second fingers, the second fingers including a plurality of second apertures, a plurality of second spaces formed between the second fingers, wherein the first fingers are received within the second spaces and the second fingers are received within the first spaces;
a pin extending through the first apertures and the second apertures; and
a plurality of central support assemblies, each of the central support assemblies coupled to one or more of the rails, each of the central support assemblies including a body having internal threads; and
a plurality of central brackets, each of the central brackets including a base and a flange, the flange positioned adjacent an exterior facing surface of the rail, the base having an aperture, the threaded rod extending through the aperture and being threadably received by the internal threads of the body of the central support assembly,
wherein a space is formed between the flange and the body of the central support assembly, a corresponding one of the rails being received within the space.

13. The ready-to-assemble mattress foundation of claim 12, wherein a keyed connection is formed between the pin and at least one of the first fingers of the first corner bracket, the keyed connection prevents the pin from rotating when the pin extends through the first apertures and the second apertures.

14. The ready-to-assemble mattress foundation of claim 13, wherein the pin includes a flange and a key, the key extends from the flange, and wherein one of the first fingers at an end of the first corner bracket includes a slot, the key and the slot forming the keyed connection.

15. The ready-to-assemble mattress foundation of claim 13, wherein the pin further includes internal threads, the internal threads to enable a leg to be attached to the corner connector.

16. A ready-to-assemble mattress foundation, comprising:
a plurality of rails, the rails forming a mattress foundation having a plurality of corners;
a first corner bracket, the first corner bracket including a plurality of first fingers, the first fingers including a plurality of first apertures, a plurality of first spaces formed between the first fingers;
a second corner bracket, the second corner bracket including a plurality of second fingers, the second fingers including a plurality of second apertures, a plurality of second spaces formed between the second fingers, wherein the first fingers are received within the second spaces and the second fingers are received within the first spaces;
a pin extending through the first apertures and the second apertures and including internal threads;
a plurality of central support assemblies, the central support assemblies coupled to one or more of the rails, each of the central support assemblies including a base and a threaded bore, the base including a first base portion positioned inboard of the corresponding rail and defining an aperture aligned with the threaded bore, a second base portion positioned beneath the corresponding rail, and a step positioned between the first base portion and the second base portion and receiving the corresponding rail, and
a plurality of legs, each of the legs including a threaded rod threadably received within one of the internal threads of the pin or the threaded bore of the central support assemblies to position each of the legs inboard of the rails,
wherein one or more of the rails includes a bore, and a fastener is received within the bore of the rail to secure the base relative to the rail.

17. The ready-to-assemble mattress foundation of claim 16, wherein the fastener comprises a flange extending from the second base portion of the base.

18. The ready-to-assemble mattress foundation of claim 16, wherein each of the central support assemblies includes a frame including the threaded bore and having an outward facing surface extending from the base and positioned adjacent an interior facing surface of the corresponding rail.

19. The ready-to-assemble mattress foundation of claim 16, wherein each of the central support assemblies includes a fastener and a body having an aperture, a locating pin, and the threaded bore, the locating pin is received within the corresponding rail and the fastener is received within the aperture.

20. The ready-to-assembly mattress foundation of claim 19, wherein each of the central support assemblies includes a knob that threadably engages a corresponding one of the fasteners of the central support assembly.

* * * * *